3,357,127
COMBINATION CATCH AND LIVE BAIT CONTAINER
Eugene W. Barradale, 18 Maplewood Drive,
New Monmouth, N.J. 07748
Filed Oct. 5, 1965, Ser. No. 493,061
2 Claims. (Cl. 43—55)

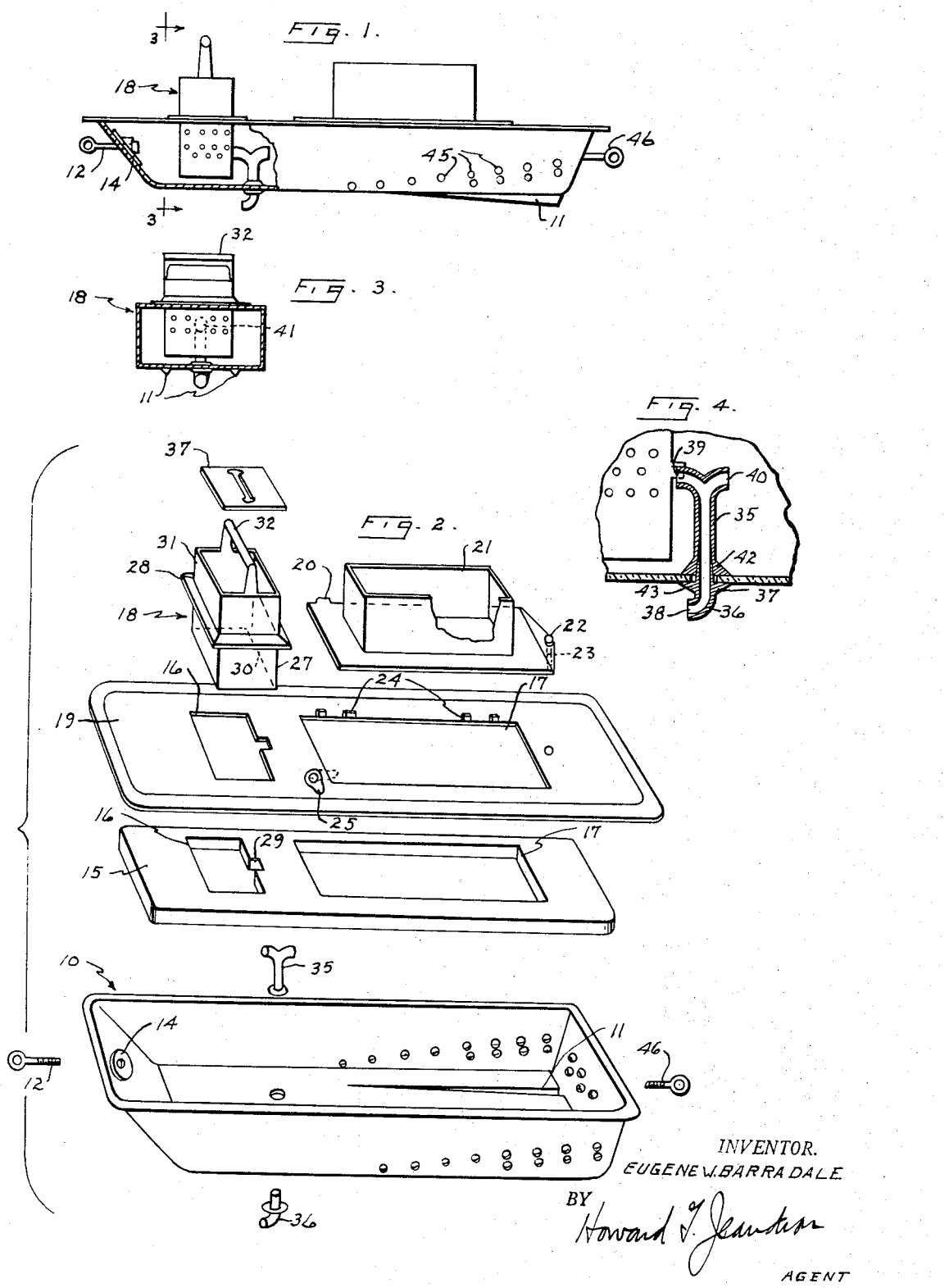

ABSTRACT OF THE DISCLOSURE

A floatable boatlike container that is partly submerged in use and towable having a removable bait container and said boatlike container used primarily for retaining live bait as well as the catch of fish.

---

This invention relates to an improved combination catch and live bait container and more particularly to a boatlike structure that floats while partly submerged and may be towed behind a larger boat while carrying the live bait and any catch of fish.

Boatlike live bait boxes are not new, for example:
(1) Spotswood #2,657,496 illustrates one form.
(2) Roat #1,619,634 illustrates another type of bait box.
(3) Daugherty #2,854,782 illustrates another, and
(4) Anderson #3,036,400 illustrates a still further type of bait tank.

An object of this invention is to improve upon the prior live bait boxes and fish storing containers that are formed as a boatlike structure and are to be towed behind a larger boat.

A further object of this invention is to provide a fresh flow of water to the bait box while it is retained in a hull or boat-like structure that is being towed.

A further object of this invention is to provide a live bait box and fish storing container that is formed as a boatlike structure and due to its design while being towed by a larger boat offers a minimum resistance in planing upon the water while retaining a fresh flow of water through the bait box and fish storing section.

A still further object of this invention is to provide a live bait box and fish storing container in the form of a boatlike structure that may be anchored to remain floating near to and be easily accessible to the fisherman.

Further objects of this invention shall be apparent by reference to the accompanying detailed description and the drawings in which FIG. 1 is a cross sectional view of the device.

FIG. 2 is an exploded view of the elements shown in FIG. 1,

FIG. 3 is a view in cross section taken on line 3—3 of FIG. 1,

FIG. 4 is a detail in cross section of the scoop tube for the bait box and fish storing sections.

Referring to the drawings and particularly FIGS. 1 and 2 there is illustrated a boat hull 10 which may be of most any form but in this instance is illustrated as a flat bottom type which will plane when being towed. The boat hull 10 may be of plastic or any desirable water repellent rigid material. In order that the boat 10 will retain a definite straight towing position, a single or double keel or centerboard 11 is provided. The boat 10 is necessarily provided with a tow eye bolt 12 affixed in the center of the front or bow of the boat to permit attaching a line or hook as desired. The tow bolt 12 may be backed up by a plate or washer 14 to increase the rigidity and strength of the bow of the boat as desired. The hull 10 is illustrated as an open top or open deck hull. A deck plate 15 may be formed to fit within the configuration of the open hull. The deck plate is constructed of a foam material to insure the floatation and sufficient buoyancy in the water. The deck plate 15 may be cemented or affixed to the upper inside perimeter of the hull 10 in any manner to insure an integral structure. Plate 15, being of a foam material, is easily cut to provide a pair of apertures 16 and 17 that are formed in a particular configuration, that is, aperture 16 is formed to permit the insertion of a bait box 18, whereas aperture 17 is formed of a sufficient size to permit easy dropping of the fish that are caught and that are to be stored in the hull. To protect the surface of the foam material in plate 15, a panel 19 of a hard finish such as a plastic sheet having a similar configuration to plate 15 with the same apertures 16 and 17, may be cemented or affixed to both the top surface of plate 15 and the top perimeter of hull 10. Thus with panel 19 affixed to plate 15 and hull 10 and plate 15 cemented within hull 10, the boat structure is complete.

A protective plate 20 having a chute like or walled formation 21 may be mounted over aperture 17. The plate 20 may be constructed of a tough hard material that will withstand a great deal of abuse thus permitting the tossing of fish through the chute 21 into the hull of the boat for storage until the boatlike container is returned to shore to be emptied when plate 20 may be removed from aperture 17. The manner of affixing plate 20 to plate 19 may be in any conventional form such as providing plate 20 at one end with a pivotal aperture 22 through which a bolt 23 may be passed, bolt 23 also passing through plate 15 to retain plate 20 in a pivotal relation over the aperture 17. A plurality of stops 24 may be provided at one side of the aperture 17 so that plate 20 will abut with stops 24 when covering aperture 17. A catch 25 may be used to lock plate 20 in its closed position.

Referring to FIG. 3 in which there is illustrated a bait box 18, the lower portion of bait box 18 is a boxlike form 27 as illustrated in FIG. 2. The portion 27 is perforated to permit the circulation of a fresh supply of water for maintaining the bait alive. Bait box 18 is provided with a flange 28 so that flange 28 will rest upon panel 19 when the bait box 18 is inserted through aperture 16. In order that the bait box will always be positioned properly in the hull, one side of aperture 16 is provided with a keyway 29 and the boxlike portion 27 of the bait box is provided with a key form 30 on one side to mate with and pass through the keyway 29. Bait box 18 is provided with a raised walled formation 31 above flange 28 and is open at the top. This is to prevent bait from jumping or being washed out of the bait box. A handle 32 is provided at the top of bait box 18. A cover 33 may be dropped over handle 32 to cover the bait box or be affixed over aperture 16 when bait box 18 is not in use.

Referring to FIGS. 1 and 4 there is illustrated a scoop tube 35. The lower end 36 of the scoop tube 35 extends through an aperture 37 in the hull 10 and the tube section 36 is turned forward so that the opening 38 of the tube 35 faces the bow or front of the boat. Tube 35 at its upper end is provided with a Y formation or fitting so that there is an aperture 39 facing against or into bait box 18 and a second aperture 40 facing toward the stern or rear of the hull 10. Thus when the boat hull is towed in the water, the scoop tube 35 will scoop water providing a circulation through opening 38 passing upward through tube 35 and the water will be divided into two streams, one stream passing through aperture 39 into the bait box 18 while the opposite stream passing through aperture 40 will flow into the section of the hull wherein the catch of fish is deposited to maintain the fish in a fresh condition. It is to be noted that where the scoop tube abuts with the bait box 18, bait box 18 is provided with a mating aperture 41. Scoop tube 35 may be flanged at 42 to provide rigidity and support for tube 35. Tube 35 at its lower end may also be provided with a flanged washer 43 to assist in providing the desired rigidity to tube 35. Referring to FIG. 1 it is to be noted that hull 10 is provided with a plurality of perforations 45 in the lower rear portion of the hull. The quantity of perforations is not important as long as there are sufficient perforations to permit a flow of water in or out of the hull as desired but the perforations are put in a particular pattern as the hull will tend to ride with the stern down in the water due to the heavier catch in the stern portion of the hull thus there will be a sufficient amount of water circulating in this area at all times. In the event the towed hull is towed at an excessive speed and the hull were to plane perfectly flat, the scoop tube 35 will still supply a flow of water over the catch of fish and permit this water to escape through apertures 45. Although the boatlike structure has been described with relation to being towed, the boatlike structure may also be utilized in a stationary position by a fisherman by tying the boat by means of its bolt 12 and an additional eye bolt 46 affixed in the stern of the boat. This permits anchoring the boatlike structure at both ends to retain it in a fairly steady relationship to the fisherman to permit easy access to the bait box or the catch area as desired.

Although the device has been described as a boatlike structure for being towed, it is not necessarily formed entirely for towing, it may be a perfectly square boxlike structure for stationary fishing and although the boatlike structure has been illustrated as reduced to an area for the bait box and an area for the catch, it may be mounted in a boxlike or boatlike structure larger than the area as designated herein to provide storage for other articles as desired without departing from the spirit of this invention and this invention shall be limited only by the appended claims.

What is claimed is:

1. A floatable boatlike structure for live bait and a catch of fish that may be stored and retained in a fresh condition which includes a boatlike hull, said hull provided with a plurality of perforations to be submersible, said hull having a panel secured therewith and a floatation plate retained within said hull to provide partial floatation, said panel provided with an opening to receive a removable perforated live bait box positioned within said hull, said panel provided with a chute like opening to provide easy access to one area of said haul for fish that are caught, said hull provided with a tow eye bolt for towing said hull behind another boat, said hull provided with a scoop tube terminating in a double ended Y shaped outlet directed, one end of said outlet to supply a fresh flow of water to said bait box within said hull and the other end of said outlet directed to provide water over the catch of fish that may be stored, said hull designed with a flat bottom to permit planing when said hull is towed at sufficient speed to lift itself out of the water and said hull provided with a keel to assist in maintaining said hull on a steady course when towed.

2. In a device according to claim 1 in which the perforations in said hull are provided as a predetermined pattern that is determined by the planing attitude of the hull when it is towed so that an area of said hull below said perforations shall retain water at all times.

References Cited

UNITED STATES PATENTS

| | | | |
|---|---|---|---|
| 367,056 | 7/1887 | Owsley | 43—55 |
| 1,731,191 | 10/1929 | De Roy | 43—55 |
| 1,788,255 | 1/1961 | Thomas | 43—55 |
| 3,084,472 | 4/1963 | Feik | 43—55 |
| 3,196,576 | 7/1965 | Thomas | 43—56 |
| 3,304,645 | 2/1967 | Hardesty et al. | 43—55 |

HUGH R. CHAMBLEE, *Primary Examiner.*